United States Patent [19]

Sircar

[11] Patent Number: 4,813,980
[45] Date of Patent: Mar. 21, 1989

[54] RECOVERY OF NITROGEN, HYDROGEN AND CARBON DIOXIDE FROM HYDROCARBON REFORMATE

[75] Inventor: Shivaji Sircar, Wescosville, Pa.
[73] Assignee: Air Products and Chemicals, Inc., Allentown, Pa.
[21] Appl. No.: 109,794
[22] Filed: Oct. 16, 1987
[51] Int. Cl.[4] .............................................. B01D 53/04
[52] U.S. Cl. ............................................ 55/26; 55/58; 55/62; 55/70; 55/74; 55/75; 423/359
[58] Field of Search ................... 55/25, 26, 31, 33, 58, 55/62, 68, 70, 73, 74, 75; 423/359

[56] References Cited

U.S. PATENT DOCUMENTS

| | | | |
|---|---|---|---|
| 3,430,418 | 3/1969 | Wagner | 55/62 X |
| 3,564,816 | 2/1971 | Batta | 55/62 X |
| 3,702,525 | 11/1972 | Simonet et al. | 55/25 |
| 4,077,779 | 3/1978 | Sircar et al. | 55/25 |
| 4,171,206 | 10/1979 | Sircar | 55/26 |
| 4,171,207 | 10/1979 | Sircar | 55/26 |
| 4,375,363 | 3/1983 | Fuderer | 55/25 |
| 4,376,758 | 3/1983 | Pagani et al. | 423/359 |
| 4,406,674 | 9/1983 | Knoblauch et al. | 55/25 |
| 4,414,191 | 11/1983 | Fuderer | 55/26 X |
| 4,479,925 | 10/1984 | Shires et al. | 423/359 |
| 4,624,841 | 11/1986 | Hidaki | 55/25 X |
| 4,671,893 | 6/1987 | Pinto | 55/26 X |
| 4,695,442 | 9/1987 | Pinto et al. | 55/25 X |

OTHER PUBLICATIONS

Kirk-Othmer: Encyclopedia of Chemical Technology, third Edition (1978), vol. 2, title page, pp. 470 and 488.

Primary Examiner—Robert Spitzer
Attorney, Agent, or Firm—Geoffrey L. Chase; James C. Simmons; William F. Marsh

[57] ABSTRACT

Multi-column pressure swing adsorption process for simultaneous production of ammonia synthesis gas and carbon dioxide from a reformer off gas having hydrogen, nitrogen and carbon dioxide as major components accompanied by minor quantities of methane, carbon monoxide and argon as impurities. The PSA system features two groups of adsorbent columns in which $CO_2$ is adsorbed in adsorbers of the first group, the essentially $CO_2$-freed effluent being charged to an adsorber of the second group for removal of minor impurities while discharging an effluent gas having an $H_2/N_2$ content stoichiometric for $NH_3$ synthesis. The $CO_2$ recovered from the first group of adsorbers is available at a high purity for reaction with the ammonia product for production of urea.

18 Claims, 2 Drawing Sheets

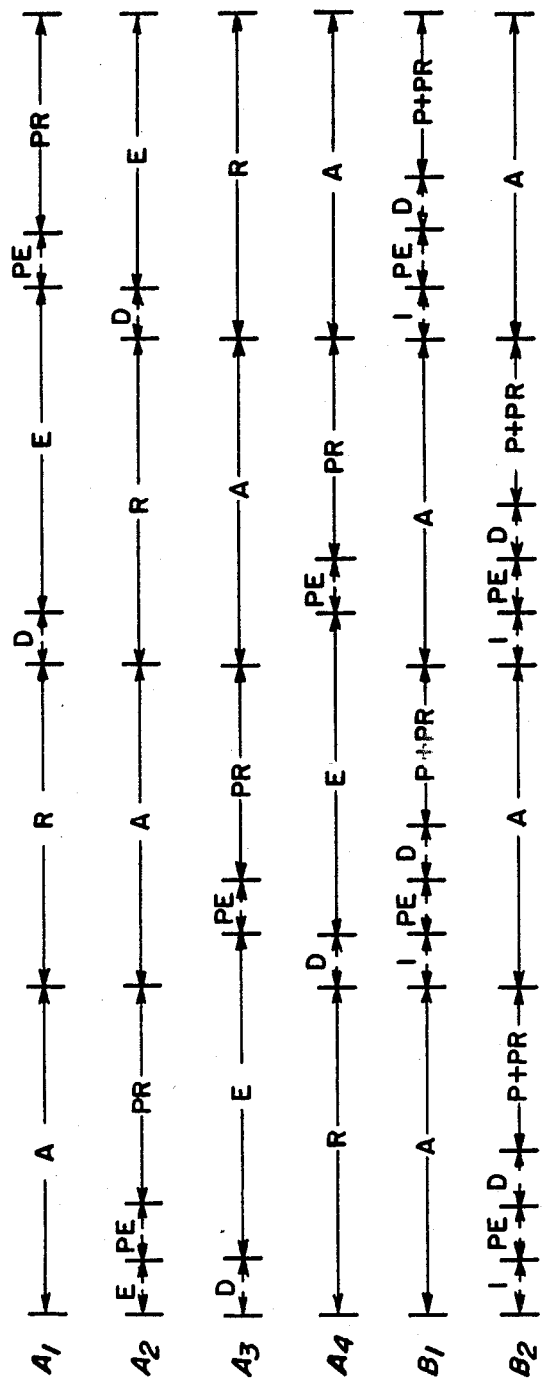

RECOVERY OF NITROGEN, HYDROGEN AND CARBON DIOXIDE FROM HYDROCARBON REFORMATE

TECHNICAL FIELD

The present invention is concerned with pressure swing adsorption (PSA) processes and is more particularly directed to improvements in such processes designed for simultaneous production and recovery from a hydrocarbon reformate of $CO_2$ and $NH_3$ synthesis gas.

BACKGROUND OF THE INVENTION

The production and recovery of hydrogen by steam reforming of methane-rich gas mixtures, such as natural gas, naphtha, or other mixtures of low molecular weight hydrocarbons, are well known in the art. Processes are also known in which the effluent from hydrocarbon steam reforming is subjected to a secondary oxidative operation in the presence of added air. In instances where the produced hydrogen is intended for use in production of ammonia, the amount of air employed in the secondary reforming step serves, in certain of the known systems, to furnish all or part of the nitrogen required for reaction with the product hydrogen for ultimate synthesis of $NH_3$. Since oxides of carbon (CO and $CO_2$) are present in the secondary reformate as undesired contaminants, the secondary reformate is subjected to water gas shift reactions to convert CO to $CO_2$ and then to procedures for removal of contained $CO_2$ and for conversion of any residual carbon oxides to methane (methanation). This conventional process for production of ammonia synthesis gas is described, for example, in U.S. Pat. No. 4,479,925 and in Kirk-Othmer: Encyclopedia of Chemical Technology, third edition (1978), volume 2 pages 470-516; a typical process flow diagram appearing at FIG. 13 on page 488.

The gas composition obtained by the primary steam reforming of methane and secondary reformation in presence of added air, after undergoing a conventional shift reaction is comprised predominantly of hydrogen with lesser amounts of $CO_2$ and nitrogen constituting >98% of the total gas mixture. A typical composition, after the high temperature shift reaction may comprise (dry basis) for example:

|  | Mol % |
|---|---|
| Hydrogen | 61.0 |
| Carbon dioxide | 18.0 |
| Nitrogen | 20.0 |
| Carbon monoxide | 0.5 |
| Methane | 0.3 |
| Argon | 0.2 |

PRIOR ART

In conventional practice for production of ammonia synthesis gas, the removal of contained carbon dioxide from the shift reactor effluent is effected by absorption in a liquid solvent such as monoethanolamine (MEA) or alkaline carbonate solution. This practice requires further treatment of the $CO_2$-freed product gas for removal of residual contaminants. A common practice is to rid the syngas of contained CO by methanation, as shown for example in U.S. Pat. No. 4,376,758. The resulting gas mixture will then contain in addition to the desired hydrogen and nitrogen, small quantities of relatively inert contaminants such as methane, argon and in some instances nitrogen in excess of the stoichiometric proportion for $NH_3$. These, being present in the feed gas charged to the ammonia synthesis convertor, build up in the ammonia recycle loop of the system, reducing the output of desired ammonia. Various schemes have been proposed in attempt to avoid or overcome this problem and to enhance the purity of the gas composition charged for conversion to $NH_3$.

According to the procedure described in U.S. Pat. No. 4,375,363 an elaborate pressure swing adsorption system is employed for selective removal of adsorbable impurities from a hydrogen-rich gas mixture containing a very dilute amount of $N_2$. The impurity-laden adsorbent bed is purged with nitrogen gas from an external source and also repressured with external nitrogen gas, thereby furnishing the nitrogen requirement for $NH_3$ synthesis gas in the PSA effluent.

Separation of contained impurities from a hydrogen-rich gas stream by PSA is disclosed in a number of prior art patents. For example, a PSA system for the removal of carbon dioxide and/or hydrocarbon gases from hydrogen-containing gas mixtures is disclosed in U.S. Pat. No. 4,077,779. This patented system is also stated to be applicable for separation of methane from its admixture with $CO_2$. A number of earlier patents for the recovery of hydrogen from gaseous mixtures with $CH_4$ and/or $CO_2$ are listed in the introductory portion of the patent specification.

U.S. Pat. No. 4,171,206 of the present applicant, discloses the treatment of a shift convertor effluent gas from a hydrocarbon reformer plant, wherein hydrogen and carbon dioxide are separately recovered by PSA, substantially freed of minor dilute components such as methane, carbon monoxide and nitrogen.

By the novel method of the present invention there is simultaneously produced ammonia synthesis gas and $CO_2$ from a reformer off gas, with high recovery and purity of both of these products and further production of useful high BTU waste gas.

SUMMARY OF THE INVENTION

In accordance with the invention a unique multi-column pressure swing adsorption system and process is employed for separation and individual recovery of an ammonia synthesis gas mixture ($N_2$ and $H_2$) and carbon dioxide from reformer off gas, each at high purity. These recovered gases can be inter-reacted for manufacture of urea. Moreover, since the ammonia synthesis gas obtained by the method of the invention can be produced essentially free of CO and $CH_4$, the need for methanation is eliminated and build up of $CH_4$ in the ammonia synthesis gas loop is avoided.

The preferred system employed in practice of the invention comprises a group of adsorbent columns (A) sequentially operated in parallel, each of the A columns being coupled in series fluid flow with a B column of another group of adsorbent columns. Each of the A columns undergoes the following process steps in recited sequence:

(a) Adsorption—The feed gas is passed through a train of adsorbent beds comprised of an A bed and a B bed in series with resulting discharge of an effluent having an average approximate composition of $H_2:N_2 \sim 3:1$.

(b) High Pressure Rinse—Flow communication between the A and B bed is discontinued and a stream of $CO_2$ (98+%) is passed through the A bed alone for a preset period short of breakthrough of $CO_2$ at the effluent end of the column or the A column may be completely saturated with $CO_2$ at the end of this step depending on the overall separation performance required by the process. The effluent from the A column during this step is recycled as feed gas to another A column.

(c) Depressure—The A column is depressured by discharge of contained gas to near ambient pressure level.

(d) Evacuation—The A column is evacuated to subatmospheric level with further removal of $CO_2$-rich effluent.

(e) Equalize pressure—The A column is partly repressured by restoring flow of gas thereto from a B column.

(f) Final Pressurization—Restoring column A to near feed pressure by introduction of a selected gas so that the column is ready to undergo another cycle of steps (a) through (f).

Each of the B beds undergoes the following steps in the recited sequence:

(1) Adsorption—Receiving effluent from an A bed during the adsorption stroke (a), and discharging an effluent of approximate composition $H_2:N_2 \sim 3:1$.

(2) Pressure equalization—By discharge of gas from the B columns to an A column then undergoing step (e).

(3) Depressuring—Discharge of desorbed gas from the B column to near ambient pressure level.

(4) Purge—by introduction of a selected gas into the B column. The purge effluent is mixed with effluent from step (3).

(5) Pressurization—By introduction of a selected gas to bring the B column to initial feed pressure, and ready for repetition of the cycle.

BRIEF DESCRIPTION OF THE DRAWINGS

FIG. 2 is a schematic cycle time format of an embodiment for operation of a PSA system according to the invention.

DETAILED DESCRIPTION

Figure 1:
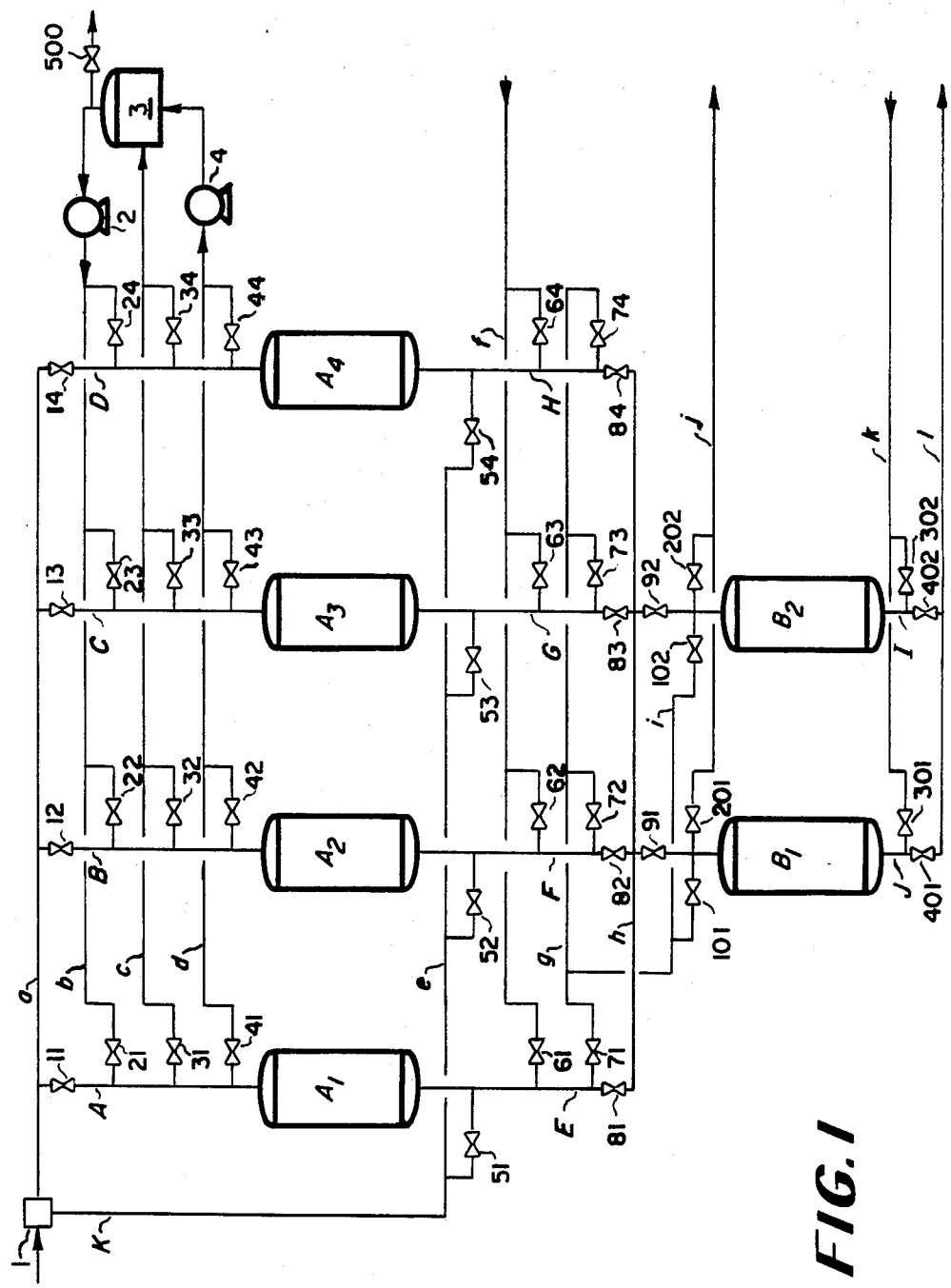
FIG. 1 of the accompanying drawings is a process flow diagram of a preferred PSA (pressure swing adsorption) system for practice of the invention.

As shown in the accompanying drawing, a PSA system that may be used in practice of the invention comprises among its principal elements four primary adsorption columns labeled A1 through A4 in fluid flow communication with two secondary adsorption columns labeled B1 and B2. Other principal components include vacuum pump 4, compressor 2 and storage vessel 3, as well as manifolds a, b, c, d, e, f, g, h, i, j, k and l, for introducing gas into and discharging gas products from the system, with lines A, B, C, D and line E, F, G, H, I, J and K connecting with the individual vessels under control of associated valves as will hereinafter appear.

While the system illustrated in the accompanying drawings comprises four primary adsorption columns and two secondary adsorption columns, it will be understood that arrangements having a larger or smaller number of such columns may be used, preferably employing twice the number of A columns than that of B columns.

The raw gas feed is introduced into the PSA system through manifold a connecting to the columns A1 through A4 respectively by lines A, B, C, D when an associated valve 11, 12, 13 or 14 is in open condition.

Each of the columns A1–A4 contains a bed of solid adsorbent preferentially selective for retention of $CO_2$ from a gas mixture containing the same. A typical feed gas for production of ammonia synthesis gas comprises chiefly hydrogen, carbon dioxide and nitrogen; with minor amounts of carbon monoxide, methane and argon, the three latter components together normally comprising no more than about 1% or so of the feed (dry basis).

Assuming that column A1 is then on-stream the feed gas will enter that column via line A through open valve 11. $CO_2$ is selectively adsorbed in the column while the unadsorbed fraction of the feed gas passes through the adsorbent bed into either of the B columns (then on-stream) through line E and open valve 81, entering on-stream B-column through the then open valve 91.

Each of the B columns contains a bed of adsorbent which preferentially retains minor contaminants present in the essentially $CO_2$-freed gas feed charged thereto. Thus, a purified gas stream comprised of hydrogen, nitrogen, and argon will be discharged from the B column, while the contaminants such as methane, carbon monoxide and carbon dioxide are adsorbed in the column.

Flow of the charge gas in series through the train of an A column and a B column is continued for a predetermined fixed time period until the impurity level in the B column effluent reaches an undesired limit, at which time introduction of feed into the involved A column is discontinued and switched into a companion A column of the system. Flow communication between an A column and B-1 is controlled by opening or closing of valve 91 and between an A column and B-2 by opening or closing valve 92.

The schedule of valve positions during the sequence of steps involved in the operation according to the illustrated embodiment of the invention is shown in Table 1. The duration time of each of the recited steps of the sequence is shown in FIG. 2 of the drawings from an arbitrary chosen 16-minute total cycle time. It is apparent that other cycle times can also be chosen.

TABLE 1

| TIME (mins) | Valve Numbers |||||||||||||||||||||||||||||
|---|---|---|---|---|---|---|---|---|---|---|---|---|---|---|---|---|---|---|---|---|---|---|---|---|---|---|---|---|
| | 11 | 12 | 13 | 14 | 21 | 22 | 23 | 24 | 31 | 32 | 33 | 34 | 41 | 42 | 43 | 44 | 51 | 52 | 53 | 54 | 61 | 62 | 63 | 64 | 71 | 72 | 73 | 74 | 81 |
| 0–1 | o | | | | | | | o | | o | | | o | | | | | | | o | | | | | | | | | o |
| 1–2 | o | | | | | | | o | | | | | o | | | | | | | o | | | | | | o | | | o |
| 2–3 | o | | | | | | | o | | | | | o | | | | | o | o | | | | | | | | | | o |
| 3–4 | o | | | | | | | o | | | | | o | | | | | o | | o | | | | | | | | | o |
| 4–5 | | o | | o | | | | | | | o | | o | o | | | | | | | | | | | | | | | |
| 5–6 | | o | | o | | | | | | | | | | o | o | | | | | | | | | | | | o | | |
| 6–7 | | o | | o | | | | | | | | | | o | o | | | | | | | o | | | | | | | |
| 7–8 | | o | | o | | | | | | | | | | o | o | | | | | | | o | | | | | | | |
| 8–9 | | | o | | o | | o | | | | | | | o | | o | | | | | | | | | | | | | |
| 9–10 | | | o | | o | | | | | | | | o | | | o | | | | | | | | | | | | o | |
| 10–11 | | | o | | o | | | | | | | | o | | | o | | | | | | | | o | | | | | |

TABLE 1-continued

| Time | | | | | | | | |
|---|---|---|---|---|---|---|---|---|
| 11-12 | O | O | | O | O | | O | |
| 12-13 | | O | O | O | O | | O | |
| 13-14 | | O | O | | O | O | | O |
| 14-15 | | O | O | | O | O | O | |
| 15-16 | | O | O | | O | O | O | |

| TIME (mins) | Valve Numbers | | | | | | | | | | | | |
|---|---|---|---|---|---|---|---|---|---|---|---|---|---|
| | 82 | 83 | 84 | 91 | 92 | 101 | 102 | 201 | 202 | 301 | 302 | 401 | 402 |
| 0-1 | | | | O | | | | | | | | O | |
| 1-2 | | | | O | | | O | | | | | O | |
| 2-3 | | | | O | | | | | O | | | O | |
| 3-4 | | | | O | | | | | | | O | O | |
| 4-5 | O | | | | O | | | | | | | | O |
| 5-6 | O | | | | O | O | | | | | | | O |
| 6-7 | O | | | | O | | | O | | | | | O |
| 7-8 | O | | | | O | | | | | O | | | O |
| 8-9 | | O | | O | | | | | | | | O | |
| 9-10 | | O | | O | | | | O | | | | O | |
| 10-11 | | O | | O | | | | | O | | | O | |
| 11-12 | | O | | O | | | | | | | O | O | |
| 12-13 | | | O | | O | | | | | | | | O |
| 13-14 | | | O | | O | O | | | | | | | O |
| 14-15 | | | O | | O | | | | O | | | | O |
| 15-16 | | | O | | O | | | | | O | | | O |

O = OPEN
BLANK = CLOSED

Assuming that column A-1 and column B-1 are then in fluid flow communication, the unadsorbed gas will flow from A-1 into B-1 by way of line E and open valve 81, through open valve 91. The unadsorbed gas leaving B-1 (substantially pure ammonia synthesis gas) through line J and open valve 401, flows into line 1 directd to the ammonia synthesis reactor (not shown).

At the termination of the adsorption step valves 11 and 81 are closed and the flow of charge gas is switched to a companion A column, say column A-2, by opening the appropriate valves serving that column. During the time interval that column A-2 is on the adsorption step, column A-1 is subjected to a rinsing operation by flowing of high purity $CO_2$ (98+%) in feed direction through the adsorbent bed therein at a pressure slightly above the feed pressure. The $CO_2$ gas used for the rinse is obtained from storage vessel 3, which is compressed by compressor 2, discharging into manifold b and introduced into line A via open valve 21. This gas flows through column A-1 and displaces void gas, as well as co-adsorbed minor components from the column while discharging the purge effluent into recycle line K via open valve 51. Line K may discharge directly into feed manifold a or into a mixing tank as shown at 1, to mix with fresh feed entering the system. The use of the storage tank 3 may be eliminated if the desorbed $CO_2$ from another A bed undergoing the following step can be directly compressed and fed to manifold b.

At the termination of the rinsing, column A-1 is depressured to near ambient pressure level by withdrawal of gas desorbed therefrom in a direction counter to that at which the feed was introduced. Thus, as shown, with the opening of valve 31 desorbed gas is caused to flow into manifold c discharging into storage vessel 3 or to the $CO_2$ compressor. $CO_2$-rich gas may be withdrawn from vessel 3 by opening valve 500, whereas gas for use in rinsing (step b) needs to be compressed as heretofore indicated.

After column A-1 has been brought to desired near ambient pressure it is desorbed by evacuation to a level in the range of about 0.07 to 0.3 atmosphere. The evacuated effluent (98+% $CO_2$) is discharged into vessel 3 (or into another storage vessel not shown) via manifold d through open valve 41. Only a part of the desorbed $CO_2$ in steps (c) and (d) of the cycle is used as the $CO_2$ rinse gas. The remaining part of the desorbed $CO_2$ forms the $CO_2$ product of this process.

As indicated in FIG. 2, during the time interval that the $CO_2$-laden A-1 column is undergoing the high pressure rinsing step (b) impurity-containing column B-1 is regenerated by being first subjected to pressure equalization with a previously evacuated A column (say A-3) followed by desorption, purge and pressurization (steps 2, 3, 4, 5).

During the pressure equalization step gas flows from the B column, in a direction counter to that of feed flow, and into an A column then being partially repressured (step e). Thus, in the cycle interval now being described, the pressure equalization takes place by flow of gas from column B-2 through open valves 102 and 71 and into column A-1 via line E, until both the A-1 and B-2 columns are at about the same pressure.

After pressure equalization has been attained, the partially pressured A-1 column is brought back to near feed pressure level by an available process gas. Thus, such repressuring may be carried out using a gas comprised of $N_2/H_2/Ar$ purged from the ammonia conversion recycle loop after removal of $NH_3$ from that gas, or with ammonia synthesis gas ($H_2/N_2$) from step (a)(1) effluent; or one may employ nitrogen from an external source if conveniently available. During repressuring of the A-1 column the B-1 column, following the pressure equalizing step, is desorbed, purged and repressured (steps 3, 4, 5).

The repressuring of the A-1 column (step f) in the illustrated embodiment, is carried out by admission of the selected gas composition into line E through manifold f and open valve 61, all the other valves associated with that column being then in closed position.

The depressuring of the B-1 column (step 3) is carried out in a direction counter to that of feed introduction by opening valve 201 into line j, through which the effluent gas may be vented or recovered for use as fuel. The B-1 column is thus brought to near ambient pressure, at which level it is then purged (step 4) with an available gas. The purge gas employed may be that purged from the ammonia synthesis recycle loop after removal of any residual $NH_3$ from that gas, or ammonia synthesis gas from step (a)(1), or nitrogen if convenient. Thus, as shown in FIG. 1, the purge gas is introduced into column B-1 by supply line k and open valve 301, dishcarging from the column into line j through open valve 201. The purge effluent is mixed with effluent from step (c). These two effluents can be used as a fuel to the reformers because they contain all of the CO, $CH_4$ and the unrecovered $H_2$ in them. The fuel value of this stream is good because it contains only a small portion of the feed $CO_2$.

To ready column B-1 for repetition of the described operating cycle, that column is brought back to initial feed pressure by introduction of suitable gas, which may be the same kind of gas as that employed in step (4). This gas is also introduced into the column via line k and open valve 301 while all other valves associated with the column are closed.

It will be understood that each of the A columns in turn undergoes the same sequence of described operations (a) through (f) and each of the B columns undergoes the described sequence of steps (1) through (5). In the illustrated embodiment, having twice as many A columns as B columns, the complete cycle of designated operations of the B columns is accomplished in half of the time required for a complete A cycle as is seen in FIG. 2.

The preferred adsorbent for the A and the B beds is A, X or Y zeolite which has been ion exchanged with one or more cations from groups I and II of the Periodic Table. Alternatively, other adsorbents that may be used include A zeolite, activated carbons, alumina, etc. A combination of adsorbents can also be used in each bed depending on the operating conditions and the composition of the feed gas.

By operation in accordance with the present invention a high purity $CO_2$ product (>98%) is recovered with high recovery (>90%) from a two-stage reformate, which product can be reacted with $NH_3$ to produce urea, thus eliminating the need for importing $CO_2$ or using a costly physico-chemical solvent absorption unit for extraction of $CO_2$.

It was indicated above that ammonia purge loop gas may be employed for final repressuring of an A bed and/or for purging and repressuring of a B bed. Such gas must be dry and free of trace $NH_3$, which condition can be readily achieved by using a thermal swing adsorber to remove water and $NH_3$ from the crude ammonia purge loop gas.

The preferred process as hereinbefore described obtains high recovery of $CO_2$ from the feed gas (>90%). If such high recovery of feed $CO_2$ is not needed the A columns can be designed for partial removal (retention) of $CO_2$ (say 30-70%) from the feed so that the remaining $CO_2$ is allowed to enter the B column during the adsorption step. By this suggested alternative mode of operation the size of the A beds can be reduced and since the subsequent $CO_2$ rinse needed for the A column would thereby be reduced, the system will require a rinse compressor of smaller size, and it will consume less power. This approach will also require a smaller vacuum pump for desorption of $CO_2$ in step (d) which will reduce the cost and energy required for evacuation of the A beds. On the other hand, the alternative system here suggested would require larger B beds for handling the $CO_2$ entering these beds and entail some extra loss of hydrogen recovery. Also, the waste gas produced during steps (3) and (4) of the B beds will contain a considerable amount of $CO_2$ which will reduce its fuel value. The afforded flexibility and the overall power and capital savings may warrant consideration of the suggested alternative in a given situation.

In practice of the invention the initial $CO_2$ adsorption is preferably carried out at about ambient temperature (60°-150° F.) and at an inlet feed pressure in the range of about 8 to 40 atmospheres.

What is claimed:

1. The method of separately recovering high purity carbon dioxide and ammonia synthesis gas composed of hydrogen and nitrogen at near the 3:1 stoichiometric ratio, from a starting gas mixture containing hydrogen, carbon dioxide and nitrogen as bulk components and less than a total of 10 mol % on a dry basis of minor components which comprises:

(a) passing the starting gas at super atmoshperic pressure into and through a first bed of solid adsorbent wherein carbon dioxide is selectively adsorbed; discharging unadsorbed gas from said first bed into and through a second bed of adsorbent effective in retaining at least part of said minor components of said starting gas; and discharging from said second bed as primary effluent the unadsorbed portion of the gas passed therethrough;

(b) rinsing said first bed with a stream of high purity carbon dioxide passed into the bed for a time short of complete breakthrough of a carbon dioxide front at the effluent end while discharging effluent gas therefrom and mixing said effluent gas with fresh starting feed gas;

(c) desorbing carbon doxide from said first bed by gas withdrawal to near ambient pressure level;

(d) lowering the pressure in said first bed by evacuation to subatmospheric level thereby obtaining an effluent rich in carbon dioxide;

(e) partly repressuring the evacuated first bed by flow of gas into said bed from a second bed which is at superatmospheric pressure level, to bring said first and second beds to substantially equal pressure; and (f) further repressuring said first bed to superatmospheric pressure level to prepare the same for further adsorption of $CO_2$ from the starting gas; said further repressuring being carried out by introduction of a nitrogen-containing gas stream in a direction counter to that employed in step (a); and during the said rinsing of said first bed regenerating the impurity-containing second bed by the sequence of steps comprising:

(i) passing gas from the second bed to an evacuated first bed to equalize the pressure level in these beds;

(ii) further withdrawing gas from said second bed to bring the same to near ambient pressure level;

(iii) purging the second bed at said near ambient pressure level with nitrogen-containing gas;

(iv) then repressuring the bed with nitrogen-containing gas to restore the same to initial adsorption pressure level for repetition of the recited cycle.

2. The method as defined in claim 1 wherein said starting gas is one obtained by primary steam reforming of a methane-rich gas mixutre followed by secondary reforming of the obtained primary reformate in the presence of added air and subjecting the obtained secondary reformate to catalytic water gas shift reaction converting carbon monoxide therein to carbon dioxide and hydrogen.

3. The method as defined in claim 2 wherein the recited steps of the defined-method are performed in a multi-bed pressure swing adsorption system comprising a first group having four first beds of adsorbent and a second group having two second beds of adsorbent.

4. The method as defined in claim 3 wherein during the time interval that a first adsorbent bed is being rinsed with high purity carbon dioxide an adsorbent bed in said second group is desorbed by gas withdrawal therefrom, purged with nitrogen-containing gas and repressured to adsorption pressure level with nitrogen-containing gas.

5. The method as defined in claim 4 wherein said nitrogen-containing gas is a portion of the unadsorbed effluent discharged from a bed of the second group during passage of starting gas therethrough from a bed of the first group.

6. The method as defined in claim 4 wherein said nitrogen-containing gas is a composition comprising hydrogen, nitrogen, and a minor amount of argon, derived from purging of an ammonia synthesis reactor effluent.

7. The method as defined in claim 4 wherein said nitrogen containing gas comprises essentially pure $N_2$ generated by an external source.

8. The method as defined in claim 3 wherein the repressuring of a first bed to superatmospheric pressure level is effected by introduction therein of a portion of the effluent discharged from a bed of the second group.

9. The method as defined in claim 2 wherein the recited rinsing of a first bed is effected in the same flow direction as the feed gas is passed therethrough and the recited desorbing and evacuation are carried out in counterflow direction.

10. The method as defined in claim 2 wherein said gas withdrawal from the second bed and the purging and repressuring of said second bed are effected in a direction counter to that employed in passing unadsorbed gas from the first bed through the second bed.

11. The method as defined in claim 2 wherein the adsorbent employed in said first bed is a molecular sieve zeolite, activated carbon, alumina, or a combination thereof.

12. The method as defined in claim 2 wherein the adsorbent employed in said second bed is a molecular sieve zeolite, activated carbon, alumina, or a combination thereof.

13. The method as defined in claim 1 wherein the evacuation effluent from said first bed is carbon dioxide of at least 98% purity.

14. The method as defined in claim 13 wherein at least part of the recovered carbon dioxide of said evacuation effluent is employed in reaction with the unadsorbed primary effluent discharged from the second bed for formation of urea.

15. The method as defined in claim 13 wherein at least part of the recovered carbon dioxide of said depressurization and evacuation effluent is employed in the rinsing of the first bed.

16. The method as defined in claim 1 wherein the passage of starting gas through said first bed and the passage of unadsorbed effluent therefrom into and through said second bed is continued until the impurity level of the effluent discharged from said second bed reaches an undesired limit.

17. The method as defined in claim 1 wherein the adsorption of carbon dioxide from the starting gas is carried out in said first bed for a time and under conditions obtaining 90–99% removal and recovery of carbon dioxide from the starting gas.

18. The method as defined in claim 1 wherein the adsorption of carbon dioxide from the starting gas is carried out in said first bed for a time and under conditions obtaining 30–70% removal of the carbon dioxide content of the starting gas, the remaining carbon dioxide being passed into said second bed.

* * * * *